United States Patent
Strohm et al.

(10) Patent No.: US 7,296,422 B2
(45) Date of Patent: Nov. 20, 2007

(54) PRODUCE PRESERVATION SYSTEM

(75) Inventors: Andrew G. Strohm, Cedar Rapids, IA (US); Ronald K. Anderson, Sidney, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 223 days.

(21) Appl. No.: 11/095,633

(22) Filed: Mar. 30, 2005

(65) Prior Publication Data

US 2005/0217282 A1    Oct. 6, 2005

Related U.S. Application Data

(60) Provisional application No. 60/558,171, filed on Mar. 30, 2004.

(51) Int. Cl.
*F24F 3/16* (2006.01)
*F25D 17/06* (2006.01)

(52) U.S. Cl. .............................. 62/78; 62/91

(58) Field of Classification Search .................. 62/78, 62/90, 91, 173, 176, 176.5, 407, 176.6, 291, 62/27
See application file for complete search history.

(56) References Cited

U.S. PATENT DOCUMENTS

| | | |
|---|---|---|
| 1,923,191 A | 8/1933 | Dailey |
| 2,443,787 A | 6/1948 | Earle |
| 2,450,844 A | 10/1948 | Stuart |
| 2,478,017 A | 8/1949 | Shoemaker |
| 2,622,409 A | 12/1952 | Stirnkorb |
| 2,697,916 A | 12/1954 | Alsing |
| 2,709,900 A | 6/1955 | Zearfoss |
| 2,770,110 A | 11/1956 | Hibbs |
| 2,894,846 A | 7/1959 | Stoddard |
| 2,988,432 A | 6/1961 | Long |
| 3,364,694 A | 1/1968 | Cohen et al. |
| 3,375,677 A * | 4/1968 | Bright et al. .................. 62/89 |
| 3,377,941 A | 4/1968 | Jaremus |
| 3,600,905 A | 8/1971 | Dymek |
| 3,905,203 A | 9/1975 | Jacob |
| 3,967,927 A | 7/1976 | Patterson |

(Continued)

FOREIGN PATENT DOCUMENTS

JP        2-82081 A  *  3/1990

(Continued)

OTHER PUBLICATIONS

Whirlpool Model GS6HEXS00.

(Continued)

*Primary Examiner*—Mohammad M. Ali
(74) *Attorney, Agent, or Firm*—Michael D LaFrenz; Kirk Goodwin

(57) ABSTRACT

A refrigerated unit is well suited for storing fruits and vegetables. A household-sized refrigerated unit includes a storage space for retaining fruits and vegetables. The temperature within the storage space is controllable within a range of approximately 40-65 degrees Fahrenheit. The humidity level within the storage space is regulated to prevent unnecessary desiccation of the fruit and vegetables, and to prevent excessive condensation. The unit is provided with a mechanism for regulating the level of ethylene gas within the storage space to either retard or accelerate ripening, as desired.

22 Claims, 3 Drawing Sheets

U.S. PATENT DOCUMENTS

| | | | |
|---|---|---|---|
| 4,013,434 A | 3/1977 | Kronenberger et al. | |
| 4,142,372 A | 3/1979 | Kato | |
| 4,165,620 A | 8/1979 | Gehauf | |
| 4,241,589 A | 12/1980 | Grimm | |
| 4,250,719 A | 2/1981 | Grimm | |
| 4,272,969 A | 6/1981 | Schwitzgebel | |
| 4,326,383 A | 4/1982 | Reed | |
| 4,358,935 A | 11/1982 | Losert | |
| 4,377,935 A | 3/1983 | Curtis | |
| 4,411,921 A | 10/1983 | Woodruff | |
| 4,505,131 A | 3/1985 | Boxall | |
| 4,509,335 A | 4/1985 | Griffin | |
| 4,557,118 A | 12/1985 | Pink | |
| 4,662,186 A | 5/1987 | Park | |
| 4,745,775 A | 5/1988 | Bussan et al. | |
| 4,751,826 A | 6/1988 | Kawahara | |
| 4,817,391 A | 4/1989 | Roe et al. | |
| 4,845,958 A * | 7/1989 | Senda et al. | 62/418 |
| 4,850,206 A | 7/1989 | Larsen | |
| 4,860,555 A | 8/1989 | Bishop | |
| 4,870,836 A | 10/1989 | Pink | |
| 4,894,997 A | 1/1990 | Urushizaki | |
| 4,914,926 A | 4/1990 | Gregory | |
| 4,922,730 A | 5/1990 | Schupbach | |
| 4,944,156 A | 7/1990 | Yamamoto | |
| 4,955,208 A | 9/1990 | Kawashima et al. | |
| 4,961,322 A * | 10/1990 | Oguma et al. | 62/179 |
| 4,979,431 A * | 12/1990 | Fujimoto et al. | 454/91 |
| 4,990,313 A | 2/1991 | Pacosz | |
| 5,040,856 A | 8/1991 | Wilkins et al. | |
| 5,095,717 A | 3/1992 | Germi | |
| 5,103,650 A | 4/1992 | Jaster | |
| 5,136,853 A | 8/1992 | Girardon et al. | |
| 5,212,962 A | 5/1993 | Kang | |
| 5,228,314 A | 7/1993 | Kawai | |
| 5,253,488 A | 10/1993 | Kim et al. | |
| 5,303,563 A | 4/1994 | Bishop | |
| 5,309,725 A * | 5/1994 | Cayce | 62/90 |
| 5,343,712 A | 9/1994 | Gowan | |
| 5,388,427 A | 2/1995 | Lee | |
| 5,403,609 A | 4/1995 | Subotics | |
| 5,417,080 A | 5/1995 | Bishop | |
| 5,421,247 A | 6/1995 | Shim | |
| 5,437,503 A | 8/1995 | Baker et al. | |
| 5,451,248 A | 9/1995 | Sadkowski | |
| 5,455,058 A | 10/1995 | Turney et al. | |
| 5,458,186 A | 10/1995 | Lee | |
| 5,460,010 A | 10/1995 | Kobayashi et al. | |
| 5,490,395 A | 2/1996 | Williams et al. | |
| 5,524,440 A | 6/1996 | Nishioka | |
| 5,540,492 A | 7/1996 | Dasher et al. | |
| 5,546,759 A | 8/1996 | Lee | |
| 5,598,713 A | 2/1997 | Bartilucci | |
| 5,632,160 A | 5/1997 | Harangozo | |
| 5,641,217 A | 6/1997 | Caruso et al. | |
| 5,642,628 A | 7/1997 | Whipple | |
| 5,649,995 A | 7/1997 | Gast, Jr. | |
| 5,661,979 A | 9/1997 | DeBoer | |
| 5,687,580 A | 11/1997 | Jeong | |
| 5,711,159 A | 1/1998 | Whipple | |
| 5,740,680 A | 4/1998 | Lee | |
| 5,782,094 A | 7/1998 | Freeman | |
| 5,799,500 A | 9/1998 | Kang | |
| 5,829,267 A | 11/1998 | Fromm et al. | |
| 5,901,564 A | 5/1999 | Comeau, II | |
| 5,918,480 A * | 7/1999 | Nagata et al. | 62/440 |
| 5,927,078 A * | 7/1999 | Watanabe et al. | 62/3.6 |
| 5,946,919 A | 9/1999 | McKinney et al. | |
| 5,946,935 A | 9/1999 | Ji | |
| 5,966,961 A | 10/1999 | Ziggiotto | |
| 5,969,606 A | 10/1999 | Reber | |
| 5,970,736 A | 10/1999 | Gong | |
| 6,000,232 A | 12/1999 | Witten-Hannah | |
| 6,055,826 A | 5/2000 | Hiraoka | |
| 6,067,815 A | 5/2000 | James | |
| 6,101,819 A | 8/2000 | Onaka | |
| 6,109,052 A | 8/2000 | Austin, Jr. | |
| 6,112,546 A | 9/2000 | Kim | |
| 6,113,671 A | 9/2000 | Garrett | |
| 6,146,600 A * | 11/2000 | Williamson | 422/307 |
| 6,170,276 B1 | 1/2001 | Mandel | |
| 6,185,948 B1 | 2/2001 | Niki | |
| 6,223,553 B1 | 5/2001 | Albert | |
| 6,223,817 B1 | 5/2001 | Oden | |
| 6,266,966 B1 | 7/2001 | Fernandez et al. | |
| 6,286,330 B1 | 9/2001 | Kopf | |
| 6,333,003 B1 * | 12/2001 | Katano et al. | 422/4 |
| 6,343,477 B1 | 2/2002 | Mandel | |
| 6,346,143 B1 | 2/2002 | McGowan | |
| RE37,630 E | 4/2002 | Behr | |
| 6,367,276 B1 * | 4/2002 | Kim et al. | 62/288 |
| 6,370,908 B1 | 4/2002 | James | |
| 6,390,378 B1 * | 5/2002 | Briscoe et al. | 236/44 C |
| 6,391,272 B1 | 5/2002 | Schroeder | |
| 6,427,463 B1 | 8/2002 | James | |
| 6,438,971 B1 | 8/2002 | Lentz et al. | |
| 6,453,693 B1 | 9/2002 | Ewert | |
| 6,460,352 B1 | 10/2002 | Lemcoff et al. | |
| 6,463,752 B2 | 10/2002 | Mandel | |
| 6,477,853 B1 | 11/2002 | Khorram | |
| 6,497,113 B1 | 12/2002 | Yamada | |
| 6,506,428 B1 | 1/2003 | Berge et al. | |
| 6,509,294 B1 | 1/2003 | Tatsumi | |
| 6,527,121 B1 | 3/2003 | Flynn | |
| 6,539,727 B1 | 4/2003 | Burnett | |
| 6,544,485 B1 | 4/2003 | Taylor | |
| 6,550,257 B1 | 4/2003 | Goetzinger et al. | |
| 6,560,974 B2 | 5/2003 | Kroll et al. | |
| 6,565,169 B1 | 5/2003 | Moreno-Olguin et al. | |
| 6,862,980 B2 * | 3/2005 | Heil et al. | 99/467 |
| 2002/0025364 A1 | 2/2002 | Audy et al. | |
| 2002/0033023 A1 | 3/2002 | Kroll et al. | |
| 2002/0037240 A1 | 3/2002 | Okada et al. | |
| 2002/0054943 A1 | 5/2002 | Flynn | |
| 2002/0104325 A1 | 8/2002 | Mandel | |
| 2002/0134090 A1 | 9/2002 | Rudick | |
| 2002/0174674 A1 | 11/2002 | Takahashi et al. | |
| 2002/0182102 A1 | 12/2002 | Fontenot et al. | |
| 2003/0010056 A1 | 1/2003 | Sakamoto | |
| 2003/0010206 A1 | 1/2003 | Painter et al. | |
| 2003/0037564 A1 | 2/2003 | Tupis et al. | |
| 2003/0046947 A1 | 3/2003 | Ohya et al. | |
| 2003/0080068 A1 | 5/2003 | Koslow et al. | |
| 2003/0090890 A1 | 5/2003 | Miozza | |
| 2003/0115892 A1 | 6/2003 | Fu | |
| 2004/0164018 A1 * | 8/2004 | Mitchell et al. | 210/502.1 |

FOREIGN PATENT DOCUMENTS

| | | | |
|---|---|---|---|
| JP | 6-288672 A | * | 10/1994 |
| JP | 7-270045 A | * | 10/1995 |
| JP | 9-324979 A | * | 12/1997 |
| JP | 10-238934 A | * | 9/1998 |
| JP | 2000-346525 A | * | 12/2000 |

OTHER PUBLICATIONS

Whirlpool Model GS6SHAXMB00.

* cited by examiner

PRODUCE PRESERVATION SYSTEM

This application is a non-provisional of U.S. Provisional Application No. 60/558,171 filed Mar. 30, 2004, which is hereby incorporated in its entirety.

FIELD OF INVENTION

This invention relates to refrigerated systems for storing and preserving produce such as fruits and vegetables. More particularly, this invention relates to a consumer-sized refrigerated unit for storing fruits and vegetables at optimal storage conditions.

BACKGROUND

The optimal conditions for storage of many fruits and vegetables are difficult to create in a standard household refrigerator. The ideal temperature for the storage of moderate temperature fruits and vegetables is generally between forty (40) and sixty-five (65) degrees Fahrenheit (approximately 4-18 degrees Celsius). The fresh food compartment of most household refrigerators is kept at a temperature below what is ideal for storage of these fruits and vegetables, in order to provide appropriate conditions for storing other fresh foods such as milk, eggs, meat, and beverages.

Additionally, the humidity level in the fresh food compartment may be too low as a result of the moisture that is naturally removed from the chilled air that cools the fresh food compartment. The difficulties of low humidity may be compounded by any blowing or other movement of air in the fresh food compartment that may accelerate the evaporation process. As a result, if the humidity level of the fresh food compartment is too low, it will cause excessive desiccation of the fruits or vegetables, which is not desirable. On the other hand, if the humidity level is too high, that results in excessive condensation of water, which creates its own problems. Ideally the humidity level will be approximately ninety percent (90%) relative humidity.

As produce ripens, it produces ethylene gas. Ethylene gas acts as a catalyst to stimulate additional ripening and eventually senescence. Typically storage times for fruits and vegetables can be enhanced by eliminating excess ethylene from the air. On occasion, it is desired to ripen produce more rapidly. On these occasions it is desirable to retain the ethylene gas in close proximity to the fruit in order to accelerate the natural ripening process. Apples and tomatoes produce relatively high levels of ethylene gas.

Different fruits and vegetables may benefit from different storage conditions. As a result, it is beneficial to have separate compartments in order to permit different storage conditions for various fruits and vegetables at the same time.

While it is known in the art to provide separate compartments within household refrigerators for storage of fruits and vegetables, these compartments commonly lack some or all of the features necessary for optimal storage of moderate temperature fruits and vegetables.

What is needed in the art is a household refrigeration unit that is dedicated to the storage of moderate temperature fruits and vegetables. Preferably the unit will allow control of temperature in a range of 40-65 degrees Fahrenheit (4-18 degrees Celsius), control of humidity levels to prevent excessive drying of the fruits and vegetables and to prevent excessive condensation, and control of ethylene gas levels to accelerate or retard ripening.

SUMMARY OF THE INVENTION

The invention is directed to a household refrigeration unit for the storage of moderate temperature fruits and vegetables. The unit is provided with a chiller for removing heat from a storage space. Preferably the unit is provided with a control that permits the temperature within the storage space to be maintained at a desired temperature. Most preferably the temperature control will permit the storage space to be maintained at a desired temperature in the range of 40-65 degrees Fahrenheit. Preferably the unit is also provided with a mechanism for controlling the humidity level within the storage space. Most preferably the humidity control mechanism will permit the humidity level within the storage space to be maintained at a humidity high enough to prevent excessive drying of fruits and vegetables, but low enough to avoid condensation of water on the fruits and vegetables. Preferably the unit is provided with a mechanism to control ethylene levels in the storage space. Most preferably, ethylene can be removed from the storage space to retard ripening, or ethylene can be selectively retained in the storage space to accelerate ripening. Preferably the storage space may be divided into separate compartments with different conditions as to temperature, humidity level, and/or ethylene level, to permit optimal storage of various types of fruits and vegetables simultaneously within the same unit.

According to one embodiment of the present invention, a refrigerated unit for preserving produce includes an insulated cabinet that includes a storage space. A chiller is operably associated with the storage space for removing heat from the storage space. A temperature control mechanism is operably associated with the chiller for controlling the chiller to regulate an air temperature within the storage space. A humidity control mechanism is operably associated with the storage space for regulating a relative humidity level within the storage space. An ethylene control mechanism is operably associated with the storage space for regulating a level of ethylene within the storage space.

According to another embodiment of the present invention, a consumer-sized refrigerator includes a first compartment and a second compartment. A temperature control mechanism will maintain an air temperature in the first compartment at a substantially different level than an air temperature in the second compartment. A humidity control mechanism maintains a humidity level in the first compartment that is substantially different than a humidity level in the second compartment. An ethylene control mechanism may be provided to remove ethylene from said first compartment.

According to another embodiment of the present invention, a method of preserving fresh produce includes providing an insulated cabinet having an enclosed storage space and placing fresh produce within the storage space. An air temperature within the storage space is maintained between forty and sixty-five degrees Fahrenheit by using an associated chiller. A humidity level within the storage space is regulated, and an ethylene level within the storage space is regulated.

Accordingly, it is a primary object of the present invention to provide an improved household unit for storage of moderate temperature fruits and vegetables that optimizes storage conditions through the control of temperature, humidity level, and/or ethylene level.

Other aspects, features and details of the present invention can be more completely understood by reference to the following detailed description in conjunction with the drawings, and from the appended claims.

DETAILED DESCRIPTION OF PREFERRED EMBODIMENTS

Figure 1:
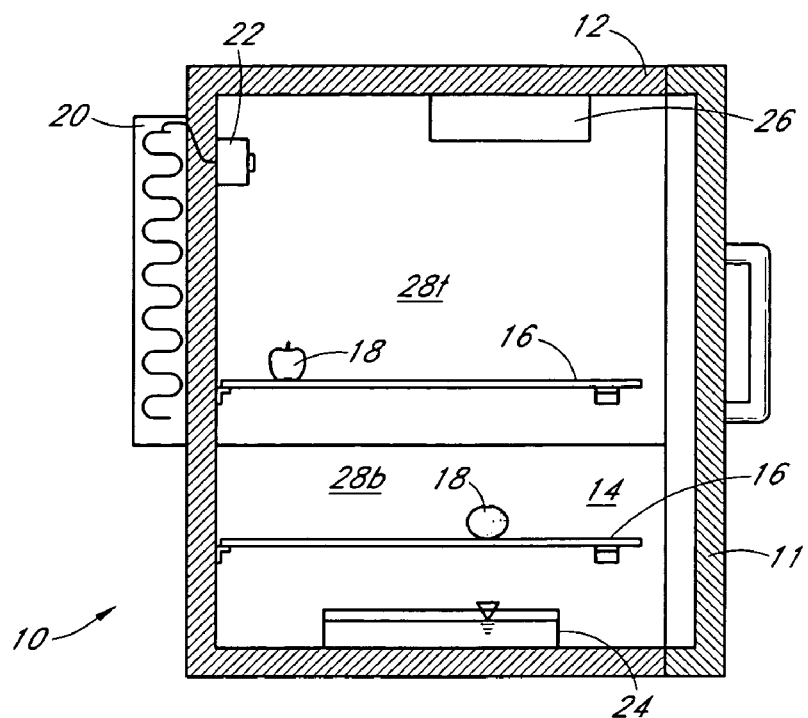
FIG. 1 is partial side view of a refrigeration unit according to the present invention that includes a temperature control mechanism, a humidity level control mechanism, and an ethylene level control mechanism.

The present inventive produce preservation system is embodied in a refrigerated storage unit 10. FIG. 1 shows an embodiment of a storage unit 10 according to the present invention. The storage 10 includes an insulated cabinet 12 having a storage space 14. A door 11 may be attached to the cabinet 12, for example by hinges (not shown) to provide access to the storage space 14. A contact seal or gasket (not shown) is provided along the periphery of the door 11 to provide an airtight, or nearly airtight, seal between the door 11 and the cabinet 12. Support structures 16, such as shelves or racks, may be provided within the storage space 14 to support fresh produce 18, such as fruits and vegetables. A chiller 20 is used to refrigerate the storage space 14. A temperature control mechanism 22 is used to control the chiller 20 and adjust the temperature within the storage space 14 to a desired temperature. Preferably the chiller 20 and temperature control mechanism 22 are suitable to maintain the temperature within the storage space at any temperature within the range of 40-65 degrees Fahrenheit. Those of ordinary skill in the art will understand that various devices and arrangements are available for controlling the temperature within storage space. Some of the preferred mechanisms are discussed in more detail below; however, the invention should not be limited to the preferred mechanisms discussed, and any arrangement that will effectively maintain the temperature within the storage space 14 in the desired range may be used.

Still with reference to FIG. 1, a humidity level control mechanism 24 is provided to maintain the humidity level within the storage space 12 at a desired level. A relatively high humidity of 90% or more is ideal for extending the storage life of fruits and vegetables 18 without suffering deleterious effects from drying. However, it is preferred to keep the humidity level from approaching 100%, as that leads to excessive condensation which causes problems. Standing water can deteriorate the structure of the fruits and vegetables, and can provide a medium for bacteria to grow. Preferred humidity control mechanisms 24 are discussed in more detail below; however, the invention should not be limited to the preferred mechanisms discussed, and any arrangement that will effectively maintain the relative humidity in the desired range may be used.

With further reference to FIG. 1, an ethylene removal mechanism 26 is provided with the storage unit 10 to regulate the amount of ethylene that remains in the storage space 14. Ethylene gas is a natural byproduct from fruits and vegetables as they ripen. The ethylene also acts as a catalyst to further speed the ripening process of many fruits and vegetables when they are exposed to ethylene. Generally to extend the shelf life of fruits and vegetables, it is desired to remove ethylene from the storage space 14 in order to slow the ripening process. In certain instances it may be desirable to retain the maximum amount of ethylene within the storage space 14 in order to accelerate the ripening process for fruits and vegetables that need additional ripening to be ready to eat. Preferred ethylene removal mechanisms 26 are discussed in more detail below; however, the invention should not be limited to the preferred mechanisms discussed, and any arrangement that will effectively remove ethylene from the storage space 14 may be used.

The storage space 14 may be subdivided into compartments 28 in order to vary the conditions within the storage 14 to be optimized for more than one type of fresh produce 18. For example, if the storage space 14 is divided into a top compartment 28$t$ and a bottom compartment 28$b$, it would be possible to remove ethylene from the bottom compartment 28$b$, in order to slow the ripening process for any produce 18 within that compartment, while simultaneously retaining the ethylene in the top compartment 28$t$ in order to accelerate the ripening process within that compartment. Those of ordinary skill in the art will be aware of numerous options for compartmentalizing a refrigerated storage space 14.

Temperature Control Mechanisms

Figure 2:
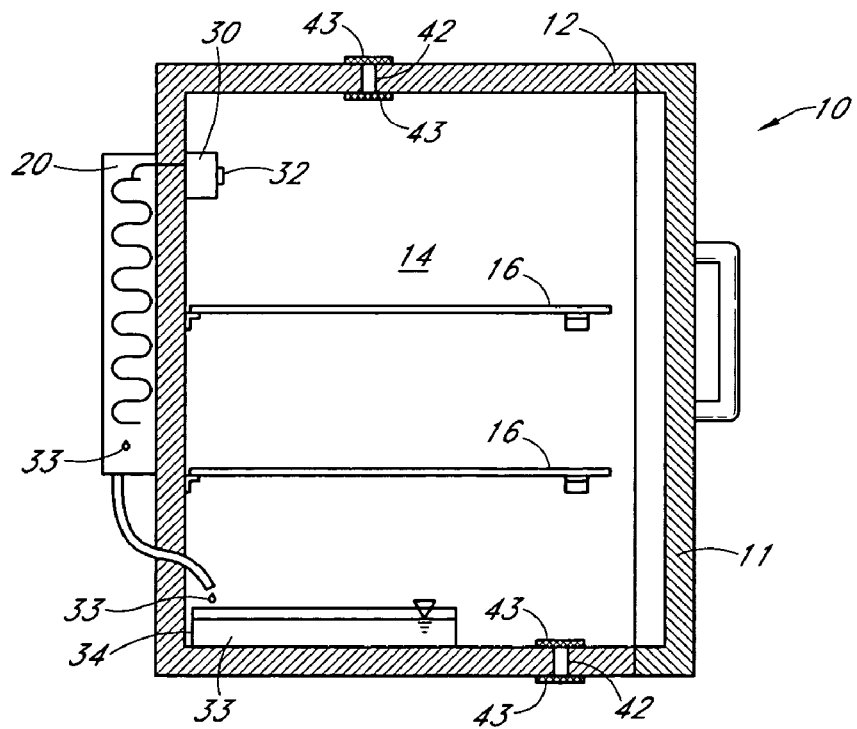
FIG. 2 is a partial side view of a refrigeration unit according to the present invention that utilizes traditional cold control to regulate the temperature in the storage space, a passive open air container to provide humidity, and natural convection to provide ethylene removal.

As noted above, those of ordinary skill in the art should be aware of several temperature control mechanisms 22 that would be effective in regulating the temperature within the storage space 14 in the desired range. FIG. 2 illustrates an embodiment of the present invention that utilizes a traditional "cold control" mechanism 30 to regulate the temperature within the storage space 14. According to this cold control mechanism 30, an adjustment mechanism 32, such as a knob or slidable lever, is provided to set a desired level of cooling. The chiller 20 is attached to the adjustment mechanism 32, and cycles on and off according to the setting. For a colder setting, the chiller 20 cycles on more often and/or for longer periods of time and/or at increased capacity. For a warmer setting, the chiller 20 cycles on less frequently and/or for shorter time periods and/or at decreased capacity. The adjustment mechanism can be adjusted up or down depending the desired temperature for the storage space. Alternatively, a thermostat may be provided to sense the temperature within the storage space 14. The thermostat will turn the chiller on when the temperature in the storage space 14 is above a desired level, and will shut the chiller off when the temperature in the storage space is at an appropriate temperature.

Figure 3:
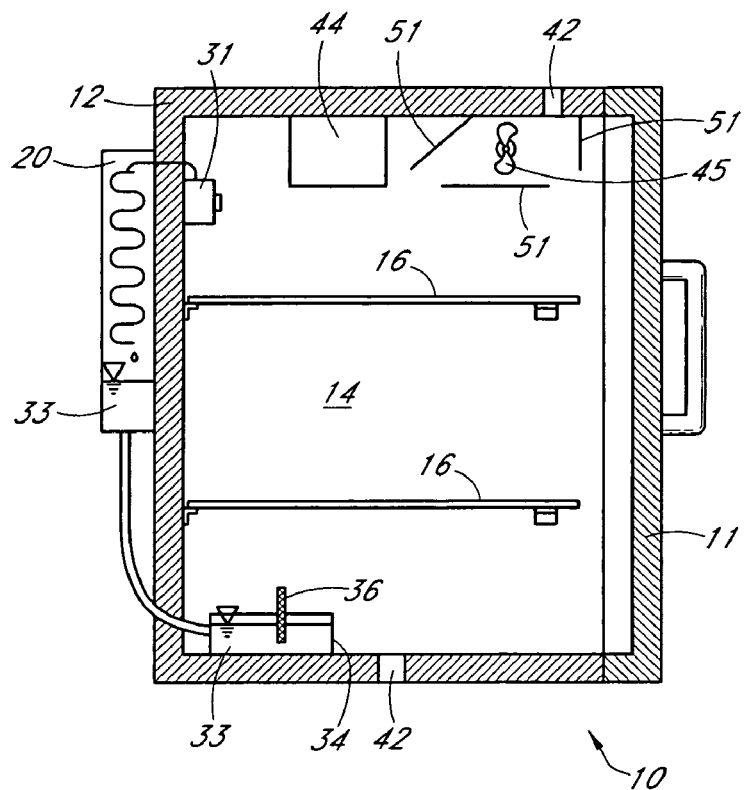
FIG. 3 is a partial side view of a refrigeration unit according to the present invention that utilizes an electronic temperature control system, a passive condensate system with a wick to aid in evaporation of water into the storage system to control humidity, and a filter to help remove ethylene from the storage space.

FIG. 3 illustrates an embodiment of the storage unit 10 that includes an electronic temperature control 31. An electronic temperature control can be comprised of logic, power supply, power switching, temperature sensing, and user interface. Logic may duplicate a traditional cold control, or implement multiple inputs and outputs to control, temperature, relative humidity and/or ethylene level.

Preferably the temperature control mechanism will be effective in maintaining a temperature within the storage space 14 within the range of 40-65 degrees Fahrenheit. Most preferably the temperature will be selectable within that range.

Humidity Control Mechanisms

Those of ordinary skill in the art should be aware of various mechanisms for controlling the humidity level within the storage space 14. A humidity sensor may be incorporated into the humidity control mechanism. The mechanisms for controlling humidity can be categorized as passive, or active. One such passive mechanism is illustrated in FIG. 2. According to this mechanism, condensate water 33, which is a natural byproduct from the chiller, is collected in a pan 34, or other open container, at the bottom of the storage space 14. The water 33 in the pan 34 will evaporate into the storage space 14 until it reaches an equilibrium when the air within the storage space is saturated. The pan 34 may incorporate an overflow drain with a trap to an evaporation means near the high side (compressor, condenser) of the refrigeration system. In this manner, the humidity within the storage space 14 is kept at a high level.

Another passive mechanism for controlling humidity is shown in FIG. 3. According to this mechanism, condensate water 33 from the chiller 20 is collected with a wick 36. The wick extends into the storage space 14, and the water evaporates from the wick 36 into the storage space 14 to raise the humidity level in the storage space 14. Preferably the wick 36 is made from an antimicrobial material to prevent the growth of potentially harmful mildew or other contaminants. The wick 36 has the advantage over the open pan 34 mechanism of increasing evaporation surface area within the storage space 14.

Figure 4:
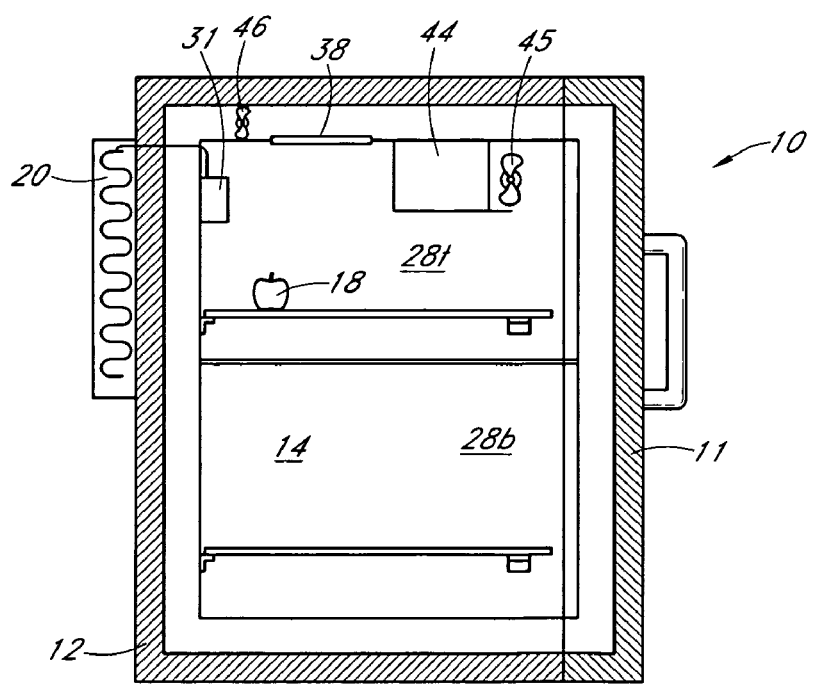
FIG. 4 is partial side view of a refrigeration unit according to the present invention that utilizes an electronic temperature control system, a closed container with semi-permeable membrane to control humidity levels, and a forced air exchange to help remove ethylene from the storage space.

A third passive mechanism for regulating humidity levels is the use of a semi-permeable membrane 38. FIG. 4 illustrates such a mechanism. The membrane is placed in a location to have dry air passing over the exterior side of it to draw moisture through the membrane 38 when the humidity level gets too high. Aside from the membrane 38 the storage compartment 28t would be sealed. The cold air from the chiller 20 is on the exterior side of the membrane and is therefore generally dry air. The membrane 38 will allow a limited amount of moisture out of the compartment 28t to prevent excessive condensation, but will also prevent the compartment 28t from becoming too dry. A shape memory polymer laminated to fabric can form the semi-permeable membrane 38. Such a product is commercially available under the name DIAPLEX, which is manufactured by Mitsubishi. A fan 46 may be provided in order to encourage the flow of dry air across the semi-permeable membrane and to enhance heat transfer.

Figure 5:
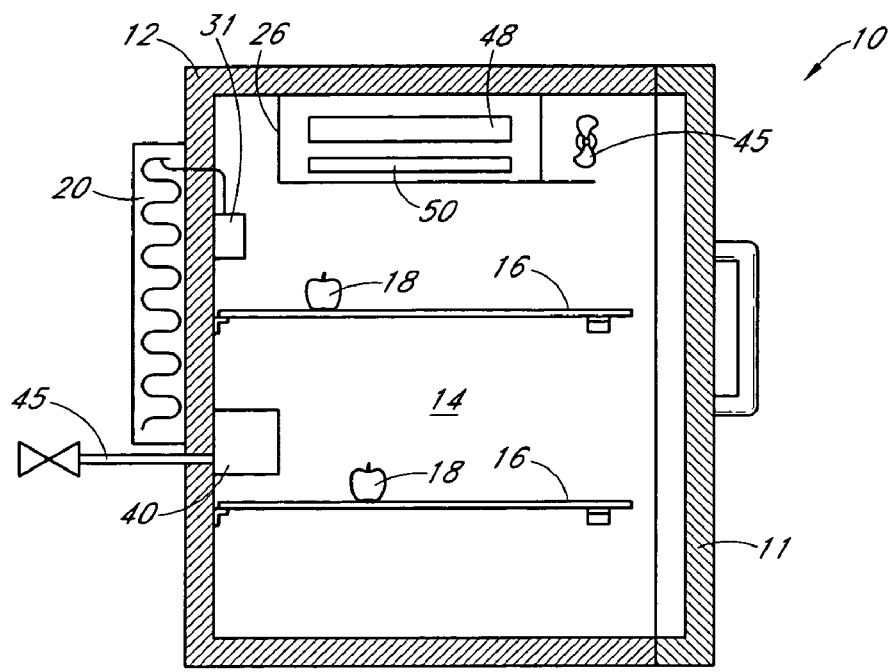
FIG. 5 is a partial side view of a refrigeration unit according to the present invention that utilizes an electronic temperature control system, an ultrasonic oscillator to disperse water droplets into the air, and an ultraviolet light in combination with a photo catalyst to remove ethylene from the storage space.

An active mechanism for controlling humidity is illustrated in FIG. 5. According this mechanism, an ultrasonic oscillator 40 is used to create a fog of tiny water droplets within the storage space 14, or a compartment 28 within the storage space 14, in order to maintain a high humidity level. The oscillator 40 may use condensate water 33, or may be connected to an external water supply such as a water line 45.

Ethylene Removal Mechanisms

As noted above, those of ordinary skill in the art will be aware of numerous mechanisms for removing ethylene from the storage space 14 in order to extend the shelf life of fruits and vegetables. An ethylene sensor may be incorporated into the ethylene regulating mechanism. Some of the preferred mechanisms are discussed hereafter.

The first mechanism is shown in FIG. 2, and comprises openings 42 provided in the insulated cabinet 12 which permit a natural air flow through the storage space 14. The flow of air through the storage space 14 will naturally remove the ethylene gas, and replace it with fresh air. Vent covers 43, such as screens, mesh wire, or filters, may be used to cover the openings 42 in order to prevent dust, insects or other contaminants from entering the storage space 14 through the openings 42.

A second passive mechanism is shown in FIG. 3. According to this mechanism a filter 44, is placed in the storage space 14 to filter the ethylene out of the air in the storage space 14. The filter 44 may use activated carbon, peat, or similar material to clean the air. The filter media would require periodic replacement as it becomes saturated. Alternatively, potassium permanganate, which reacts with ethylene, may be used in the filter 44. If potassium permanganate or similar consumer reagent is used, it will be necessary to resupply the reagent periodically as it is consumed. A stirring fan 45 may be provided to increase the flow of air into the filter 44, and to prevent stratification of the air within the refrigerated compartment 28.

FIG. 4 shows an additional mechanism for removing ethylene from the storage space 14. This mechanism is similar to that shown in FIG. 2, except that a fan 45 is used to force air flow into and/or out of the storage space 14, instead of relying on natural convection to drive the air flow. This could be combined with the filter 44 discussed above. The fan 45 also circulates the air within the storage space 14 to prevent stratification. Baffling 51 may be provided to guide the air flow within the storage space 14.

FIG. 5 shows an ultraviolet (UV) light 48 used in conjunction with a photocatalyst 50 to degrade ethylene within the storage space 14. Preferably the photocatalyst 50 is comprised of titanium dioxide coated glass tubes. When the ethylene is exposed to the UV radiation and the photocatalyst 50, it oxidizes to form carbon dioxide and water. Advantageously, the photocatalyst 50 is not consumed in the reaction and does not need to replenished under normal conditions. A fan 45 mixes the air within the storage space 14 to prevent stratification and to make sure any ethylene in the storage space is brought in contact with the UV light 48 and catalyst 50.

Figure 6:
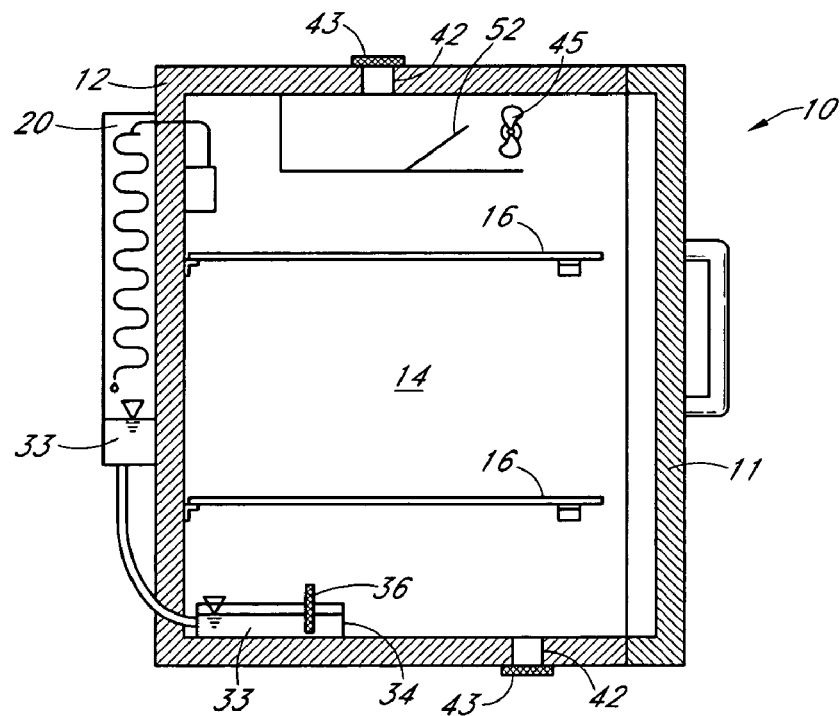
FIG. 6 is a partial side view of a refrigeration unit according to the present invention that utilizes an electronic temperature control system, a condensate water and wick system for maintaining humidity, and a controlled air exchange system for controlling ethylene levels in the storage space.

FIG. 6 shows a controlled air exchange system that can be used to remove ethylene from the storage space 14. This system utilizes a fan 46 to move air through the storage space 14 through openings 42. Dampers 52 are provided to selectively control the air exchange. Dampers 52 can be opened to allow air flow into or out of unit to remove ethylene or closed to contain the ethylene in the unit. The fan 45 may be used to draw in external air as well as to mix the air in the storage space 14 to prevent stratification. The adjustment of the dampers 52 between open and closed positions may be manual or automatic. By providing a supply of fresh external air, and exhausting the internal air that contains ethylene, the ethylene level in the storage space 14 can be regulated.

The various mechanisms for controlling temperature, humidity and ethylene levels may be combined in numerous combinations, and the invention should not be limited to the particular combinations described and illustrated herein.

Presently preferred embodiments of the present invention and many of its improvements have been described with a degree of particularity. The previous description is of preferred examples for implementing the invention, and the scope of the invention should not necessarily be limited by this description.

We claim:

1. A refrigerated unit for preserving produce comprising:
   an insulated cabinet including at least one enclosed storage space;
   a chiller operably associated with said storage space for removing heat from said storage space;
   a temperature control mechanism operably associated with said chiller for selectively controlling said chiller to regulate an air temperature within said storage space;
   a humidity control mechanism operably associated with said storage space for regulating a relative humidity level within said storage space; and
   an ethylene control mechanism operably associated with said storage space for regulating a level of ethylene within said storage space,
   wherein the ethylene control mechanism is configured to remove and retain ethylene.

2. The refrigerated unit of claim 1, wherein said temperature control mechanism will maintain said air temperature between forty and sixty-five degrees Fahrenheit.

3. The refrigerated unit of claim 1, wherein said temperature control unit will selectively maintain said air temperature above fifty degrees Fahrenheit.

4. The refrigerated unit of claim 1, wherein the temperature control mechanism is an electronic control mechanism comprising logic, a power supply, a power switching mechanism, a temperature sensing mechanism, and a user interface.

5. The refrigerated unit of claim 1, wherein the humidity control mechanism is a passive mechanism.

6. The refrigerated unit of claim 5, wherein the humidity control mechanism comprises a container for retaining a supply of water, and wherein said container is open to the storage space such that water from said container can evaporate into the storage space.

7. The refrigerated unit of claim 5, wherein the humidity control mechanism comprises a membrane that permits passage of water vapor but not liquid water.

8. The refrigerated unit of claim 1, wherein the humidity control mechanism comprises and ultrasonic oscillator.

9. The refrigerated unit of claim 1, wherein the ethylene control mechanism comprises a filter for removing ethylene from air within the storage space.

10. The refrigerated unit of claim 9, wherein the filter comprises activated carbon.

11. The refrigerated unit of claim 9, wherein the filter comprises peat.

12. The refrigerated unit of claim 9, wherein the filter comprises potassium permanganate.

13. The refrigerated unit of claim 1, wherein the ethylene control mechanism comprises an ultraviolet light used in conjunction with a photocatalyst to degrade ethylene within the storage space.

14. The refrigerated unit of claim 1, wherein the ethylene control mechanism comprises dampers to selectively control air exchange in the storage space.

15. A consumer-sized refrigerator comprising at least a first compartment and a second compartment, and wherein said refrigerator further comprises a temperature control mechanism such that an air temperature maintained in said first compartment may be substantially different than an air temperature maintained in said second compartment and further wherein said refrigerator further comprises a humidity control mechanism such that a humidity level in said first compartment may be substantially different than a humidity level in said second compartment and wherein said refrigerator further comprises an ethylene control mechanism such that an ethylene level in said first compartment can be substantially different than an ethylene level in said second compartment and the ethylene control mechanism is configured to remove and retain ethylene.

16. The refrigerator of claim 15, wherein said temperature control mechanism will maintain an air temperature is said first compartment between forty and sixty-five degrees Fahrenheit.

17. The refrigerated unit of claim 15, wherein the ethylene control mechanism comprises dampers to selectively control air exchange in the storage space.

18. A method of preserving fresh produce having a temperature control mechanism, a humidity control mechanism, and an ethylene control mechanism, the method comprising the steps of:
   providing an insulated cabinet having at least one enclosed storage space;
   placing fresh produce within said storage space;
   maintaining an air temperature within said storage space between forty and sixty-five degrees Fahrenheit by using an associated chiller;
   regulating a humidity level within said storage space; and
   regulating a level of ethylene within said storage space by using the ethylene control mechanism to remove and retain ethylene.

19. The method of preserving fresh produce according to claim 18, wherein said regulating a humidity level step comprises collecting water condensed by said chiller and permitting said condensed water to evaporate into said storage space.

20. The method of preserving fresh produce according to claim 18 wherein said regulating a level of ethylene step comprises forcing air within said storage space through a filter that removes ethylene from the air.

21. The method of preserving fresh produce according to claim 18 wherein said regulating a level of ethylene step comprises providing a catalyst to degrade ethylene within said storage space.

22. The method of preserving fresh food according to claim 18, wherein the step of regulating a level of ethylene comprises at least one of the following: opening dampers to remove ethylene and closing dampers to retain ethylene.

* * * * *